Dec. 15, 1959  J. L. BOWER ET AL  2,916,826
DEVICE INDICATING RELATIVE POSITION BETWEEN
WORKPIECE AND LINE SCRIBER
Filed Oct. 24, 1955  3 Sheets-Sheet 1

INVENTORS
JOHN L. BOWER
WILTON R. ABBOTT
BY
William R. Lane
ATTORNEY

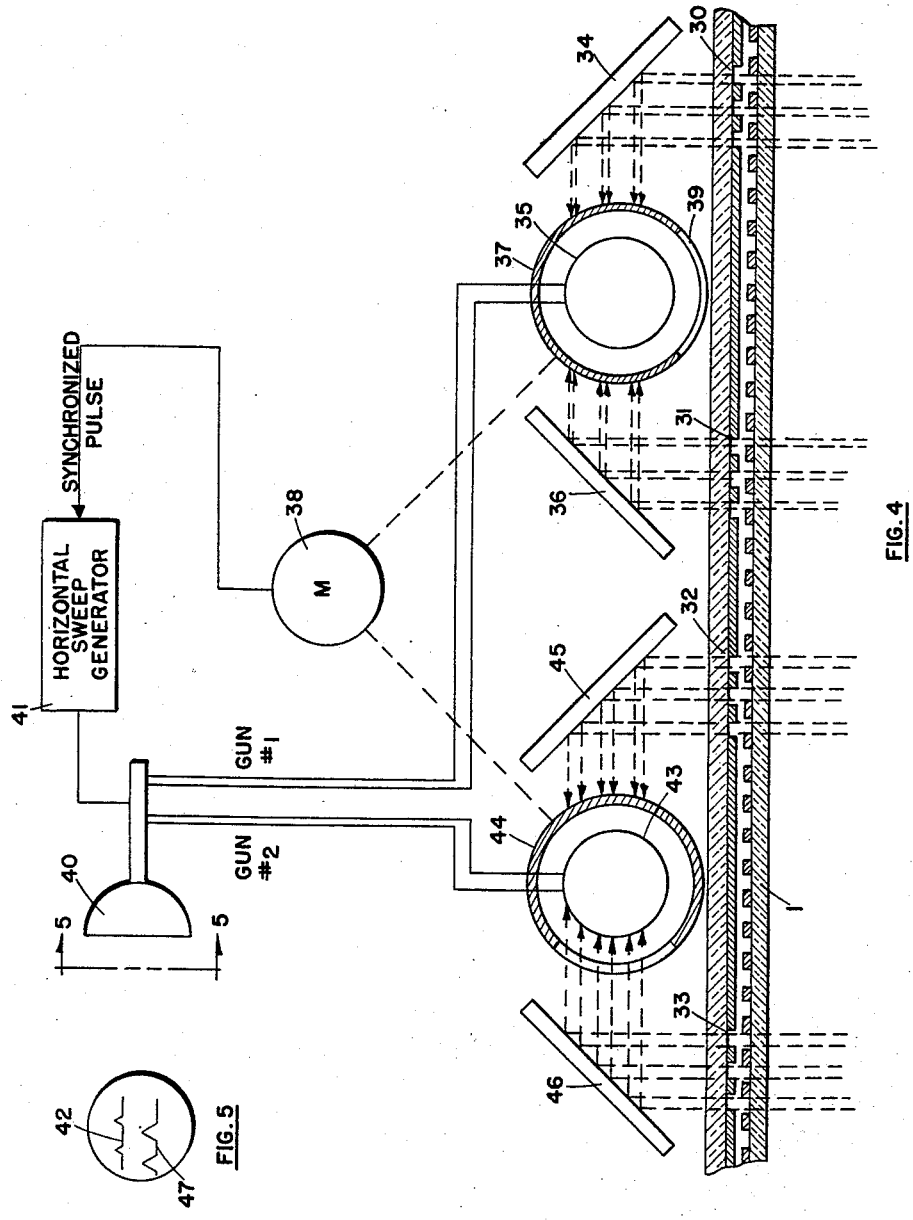

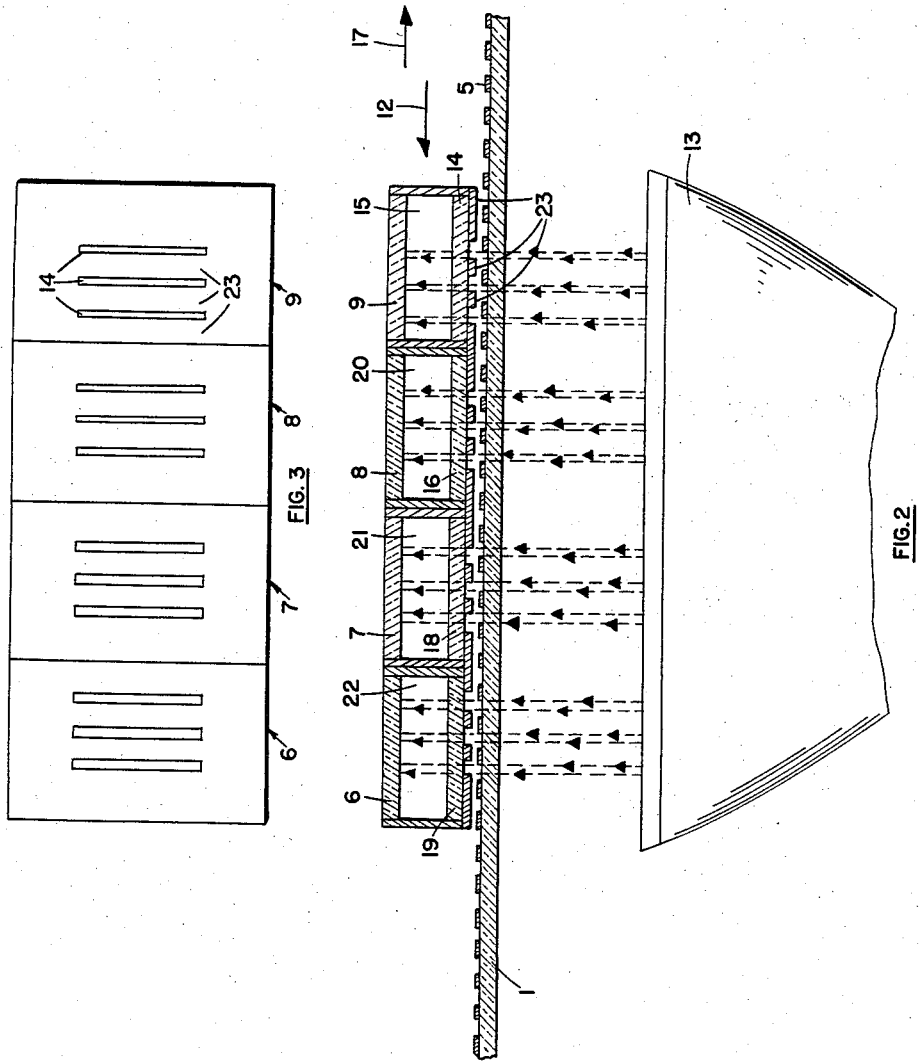

United States Patent Office 2,916,826
Patented Dec. 15, 1959

2,916,826

DEVICE INDICATING RELATIVE POSITION BETWEEN WORKPIECE AND LINE SCRIBER

John L. Bower, Downey, and Wilton R. Abbott, Whittier, Calif., assignors to North American Aviation, Inc.

Application October 24, 1955, Serial No. 542,378

7 Claims. (Cl. 33—32)

This invention relates to position-indicating devices, and particularly to a device which utilizes a null comparison between two or more variables to accurately indicate the relative position between two objects.

It is frequently desirable to obtain an accurate indication when two objects are in a predetermined positional relationship. This is particularly desirable when the relative position between the two objects is periodically changed by large increments. For example, although machine tools have been developed which are highly precise when used for making precision linear rulings on a reference gauge, such machine tools seldom have a capacity for scribing at any one setting a gauge of more than 40 inches in length. If it is desired to have a gauge which is longer than 40 inches, it is necessary to reset the workpiece relative to the machine tool before completing the scribing operation. In the past, the method of resetting the scriber usually consisted of utilizing the microscope to compare the relative positions of the rulings on the gauge before and after it is reset. Such a method may readily result in resetting errors of as large as 15 microns in a machine tool capable of ruling to an accuracy of 2 microns.

It is therefore an object of this invention to provide an improved position-indicating device useful in accurately positioning a first object having a plurality of spaced rulings relative to a second object.

It is another object of this invention to provide an improved position-indicating device utilizing a plurality of pick-off means sensitive to the rulings on one apparatus, and having outputs proportional to the relative positions of said pick-off means with respect to said rulings, with at least two of said pick-off means being spaced a predetermined distance apart, and means for comparing the outputs of said spaced pick-off means.

It is a further object of this invention to provide a photosensitive resetting device useful for resetting a workpiece relative to a ruling machine capable of making substantially uniform rulings of light-transmitting and light-absorbing surfaces on the workpiece comprising at least two photosensitive pickoffs spaced an effective 90-space-degrees apart relative to success rulings on said workpiece, each of said pickoffs utilizing a grating having light-transmitting portions congruent to the light-transmitting surfaces on said workpiece and further having indicating means with outputs sensitive to the magnitude of the light transmitted by said workpiece and said gratings; a third photosensitive pickoff spaced a predetermined distance from said first-named photosensitive pickoffs and constructed similar to said first-named photosensitive pickoffs; and means for moving in unison said photosensitive pickoffs relative to said workpiece whereby when the magnitudes of the outputs of the said first two photosensitive pickoffs are equal and the magnitude of the output of said third photosensitive pickoff is either greater than or less than the outputs of said first two photosensitive pickoffs, said workpiece and said ruling machine are in a preselected positional relationship.

Other objects of invention will become apparent from the following description taken in connection with the accompanying drawings, in which:

Fig. 2 is a section view taken along the line 2—2 of Fig. 1;

Fig. 3 is a plan view of the indicating means shown in Fig. 2;

Fig. 4 is a section view, partly schematic, of an alternative embodiment of the position-indicating device contemplated by this invention; and Fig. 5 is a view of the oscilloscope plate taken along the line 5—5 of Fig. 4.

Figure 1:
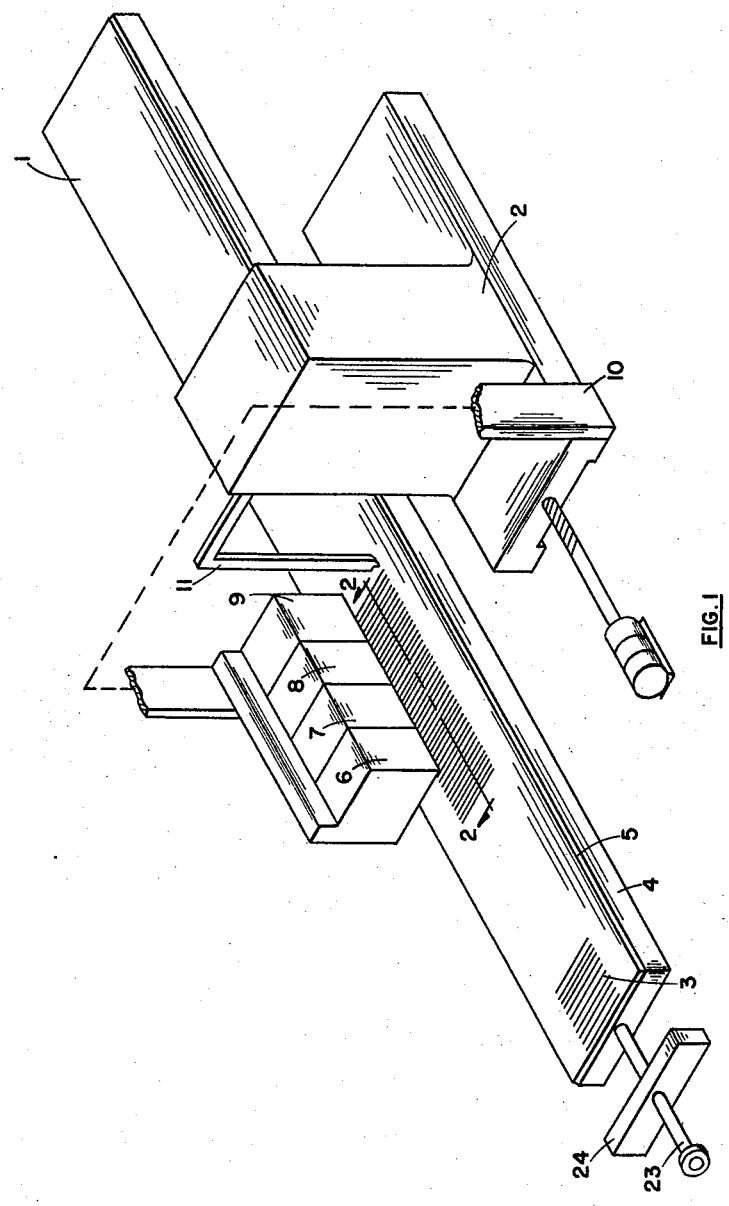
Fig. 1 is a diagrammatic view of a preferred embodiment of the null relative position-indicating device contemplated by this invention.

Referring now to Fig. 1, workpiece 1 is to be scribed by precision linear ruling machine 2 along center portion 3 to form thereby a plurality of parallel equispaced, equiwidth, light-transmitting and light-absorbing sections. Workpiece 1 may consist of glass plate 4, one surface of which is covered by opaque coating 5. Ruling machine 2, which may be a conventional precision scriber, cuts through and removes a section of opaque coating 5 on glass plate 4. Then, machine 2 is moved a predetermined distance relative to workpiece 1 and a second strip is removed. For example, the material removed may be strips 0.001 inch wide. The distance between the center lines of adjacent strips may be 0.002 inch. The extension to other widths and distances is readily apparent and need not be further described here. Assume workpiece 1 is too long to be accurately handled by machine tool 2 with only one setting of the workpiece. It is then necessary to reset workpiece 1 relative to machine tool 2 before completing the scribing operation. In order to accomplish this resetting operation, some means must be provided to indicate the exact space relationship between the workpiece and the scriber.

The position-indicating device of this invention is utilized to produce an instantaneous accurate indication of the relative position of machine tool 2 and workpiece 1. In the example of Fig. 1, the position-indicating device utilizes four pick-off heads 6, 7, 8 and 9 which move in unison. The pick-off heads are also rigidly attached to machine tool 2 by means of bracket 10. Thus, the outputs of pick-off heads 6, 7, 8 and 9 can be used to accurately indicate the instantaneous position of workpiece 1 with respect to the cutting edge of scriber 11.

Referring now to Fig. 2, a sectional view of the workpiece and the pick-off heads is shown, taken along the line 2—2 of Fig. 1. This view is magnified many times for purposes of explanation. As shown in Fig. 2, the portion of workpiece 1 adjacent to pick-off heads 6, 7, 8 and 9 has already been scribed with a plurality of equispaced, equiwidth light-transmitting lines, leaving a section of opaque coating 5 between adjacent lines. For convenience of explanation, the distance between corresponding portions of successive rulings is divided into 360-space-degrees. Thus, the center line of one ruling is 360-space-degrees from the center line of the next succeeding ruling.

Each of pick-off heads 6, 7, 8 and 9 is provided with a grating which has light-transmitting sections 14 and light-absorbing sections 23. These sections are constructed congruent with the light-transmitting and light-absorbing surfaces of workpiece 1. Source 13 is a conventional source of light rays having a lens system which directs substantially parallel rays of light onto the lower surface of workpiece 1 opposite to pick-off heads 6, 7, 8 and 9. Therefore, as pick-off head 9, for example, is moved in the direction of arrow 12, the magnitude of the light from source 13 passing through workpiece 1 and grating 14 of pick-off head 9 varies substantially linearly between maximum and minimum values.

For convenience of description, grating 14 and workpiece 1 are considered "in phase" or positioned with 0° phase relationship when the maximum amount of light is permitted to enter chamber 15 from source 13. This condition is attained when the light-transmitting portions of grating 14 are exactly opposite the light-transmitting portions of workpiece 1. Similarly, when the minimum amount of light is transmitted into chamber 15, grating 14 and workpiece 1 are considered "out of phase" or positioned with a 180° phase relationship. Positions in-between are indicated by corresponding phase angles with the phase angle increasing as the pick-off head is moved in the direction of arrow 12. Thus, as shown in Fig. 2, grating 14 has a phase angle of 225-space-degrees with respect to workpiece 1. Similarly, grating 16 of pick-off head 8 has an instantaneous phase angle of 135-space-degrees; grating 18 of pick-off head 7 has an instantaneous phase angle of 45-space-degrees; and grating 19 of pick-off head 6 has an instantaneous phase angle of 315-space-degrees.

Since the widths, normal to the direction of movement of workpiece 1, of all of the light beams entering chambers 15, 20, 21 and 22 of pick-off heads 9, 8, 7 and 6, respectively, are equal, the magnitude of light strength entering the chambers is a function of the width of the beams parallel to the direction of movement of workpiece 1, that is, is a function of the phase angle between workpiece 1 and the corresponding grating. When the pick-off heads are in the position shown in Fig. 2, the widths of the light beams entering chambers 15 and 20 are equal, being 45-space-degrees wide. Similarly, the widths of the light beams entering chambers 21 and 22 are equal, being 135-space-degrees wide. It is to be noted that if the pick-off heads are moved 1-space-degree in the direction of arrow 12, the widths of the light beams entering chambers 15, 20, 21 and 22 become, respectively, 46, 44, 134 and 136-space-degrees. An optical comparison of the light beams now entering chamber 15 with those entering chamber 20 readily shows the unequal condition in widths of beams. Upon observing the unequal condition, the operator moves workpiece 1 until a condition of equality of widths is observed. This movement may be accomplished by turning threaded screw 23 in stationary support 24 of Fig. 1.

The relative positions of the cutting edge of scriber 11 and the pick-off is such that when the chambers of pickoffs 8 and 9 are subjected to light beams of equal magnitudes and, further, when the magnitudes of the light beams entering chambers 15 and 20 are lower than the magnitudes of the light beams entering chambers 21 and 22 of pick-off heads 7 and 6, the machine tool is in the proper position to continue cutting sections out of coating 5. It is to be noted that there are only two positions within a 360-space-degree movement of the pick-off heads in which the condition of equilibrium between light beams in chambers 15 and 20 is attained. These are when grating 14 is in a 225° phase relationship with workpiece 1 and when grating 14 is in a 45° phase relationship with workpiece 1. In the latter instance, however, the strengths of the light beams entering pick-off heads 8 and 9 are greater than the strengths of the beams entering pick-off heads 6 and 7. Therefore, the operator knows that the workpiece is in the wrong position and makes the necessary adjustments to establish the two conditions mentioned above. It is to be noted that operation can be achieved with only pick-off heads, the operator selecting the one of the two positions for equal light beams entering pick-offs 8 and 9 in which these equal light beams are of a lower intensity.

At this point it is well to consider the precision of resetting utilizing the position-indicating device described above. Assuming the dimensional values given above, namely, light transmission sections of 0.001 inch wide with 0.002 inch between center lines, the following formulas give a good approximation of the brightness $B_1$ and $B_2$ of the light beams entering pick-off heads 9 and 8, respectively, in the vicinity of the point of equal brightness $B_0$:

$$B_1 = B_0\left(1 + \frac{X}{0.0005}\right)$$
$$B_2 = B_0\left(1 - \frac{X}{0.0005}\right)$$

where X is the displacement in inches from the position where $B_1 = B_2 = B_0$. The ordinary observer can tell when the brightness of two adjacent sources having the same color value differ by more than 1 part in 60. Assume that instead of $B_1 = B_2$, there is a maximum error, namely $$B_1 = \frac{61}{60} B_2$$

Then instead of $X = 0$, X is actually 0.00000413 inch, or .105 micron. Since it is possible for both the initial and the final readings of the relative position between workpiece 1 and the pick-off heads to be in error by this amount, the maximum total error to be expected is 0.15 micron, assuming a normally distributed error. Thus, the position-indicating device disclosed has an accuracy one hundred times better than a system utilizing a simple microscope.

Referring now to Figs. 4 and 5, a schematic view of an alternative embodiment of the position-indicating device contemplated by this invention is shown. In this embodiment, the scribed rulings on workpiece 1 are identical to those previously described with respect to Fig. 2. Further, gratings 30, 31, 32 and 33 are similar to gratings 14, 16, 18 and 19 of Fig. 2 and are similarly spaced an effective 90-space-degrees out of phase with each other. Parallel rays of light from a source (not shown) which pass through the rulings on workpiece 1 and grating 30 are reflected by mirror 34 toward photosensitive element 35. Similarly, the beams of light passing through workpiece 1 and grating 31 are reflected by mirror 36 toward photosensitive element 35. Shutter 37, driven by motor 38 and having an opening 39, is provided about photosensitive element 35 to chop the light rays directed toward photosensitive element 35 from mirrors 34 and 36, thus photosensitive element 35 is alternately subjected to the light rays passing through grating 30 and grating 31. Photosensitive element 35 produces a signal output proportional to the magnitude of the light rays entering the element. This signal is conveyed to the vertical deflection plates of a first gun of 2-gun oscilloscope 40. A synchronization pulse sensitive to the rotation of motor 38 is provided to synchronize horizontal sweep generator 41 with the rotation of shutter 37.

Referring now to Fig. 5, the pattern of the oscilloscope plate resulting from the subjection of photosensitive element 35 to the light rays passing through gratings 30 and 31 is shown by line 42. Photosensitive element 43 and shutter 44 are constructed similarly to the previously described photosensitive element 35 and shutter 37. Mirrors 45 and 46 are positioned to direct the light rays passing through gratings 32 and 33, respectively, toward photosensitive element 43. Shutter 44 chops these light rays, thereby alternately subjecting photosensitive element 43 to the light rays passing through gratings 32 and 33. Photosensitive element 43 produces an electric signal output proportional to the magnitude of the light rays to which it is subjected. This signal is conveyed to the vertical deflection plates of the second gun of oscilloscope 40. The synchronization pulse from motor 38 insures synchronism between the horizontal sweep of the second gun and the rotation of shutter 44.

Referring now to Fig. 5, line 47 is an indication of the pattern on the plate of oscilloscope 40 in response to the signal output of photosensitive element 43. In order to position the pickoffs in a predetermined relative position with respect to workpiece 1, gratings 30 to 33 of the pickoffs are moved until the size of the pips of both lines 42 and 47 on the plate of oscilloscope 40 are equal. In addition, the magnitude of the pips on line 47 is always made larger than the magnitude of the pips on line 42. When these two conditions occur, the operator is assured that workpiece 1 is positioned in the desired relationship with the position-indicating device.

It is to be noted that, although the above example compared the equivalency of the outputs of two pick-off heads having gratings spaced an effective 90-space-degrees apart, other spacings can be used in a similar manner to indicate the relative position between gauge 1 and machine tool 2. Thus, the outputs of pick-off heads 7 and 9 can be compared and made equivalent to accomplish the desired positioning. When the outputs of pick-off heads 7 and 9 are equal and, further, when the output of pick-off head 6 is preselectedly greater or less than the outputs of heads 7 and 9, the gauge is in the desired relative position. Similarly, pick-off head 8 can be used as the third comparison factor.

Although this invention has been described and illustrated in detail, it is to be clearly understood that the same is by way of illustration and example only and is not to be taken by way of limitation, the spirit and scope of this invention being limited only by the terms of the appended claims.

We claim:

1. A device for accurately indicating a predetermined space relationship between said device and a workpiece having substantially uniformly distributed light-transmitting rulings and for producing similar additional light-transmitting rulings on said workpiece, comprising four pick-off means each having a light-transmitting grating with light transmitting sections congruent to the rulings of said workpiece and having light-measuring means positioned to be sensitive to and producing an output proportional to the light transmitted by said grating; the distance between corresponding points on said workpiece rulings successive to each other being equivalent to 360 space degrees; support means maintaining a difference of 90 space degrees between the phases of the gratings of two of said pick-off means as related to the position of said workpiece rulings; support means maintaining a difference of 90 space degrees between the phases of the gratings of the other two of said pick-off means as related to the position of said workpiece rulings, each grating of one pair of pick-off means being effectively spaced approximately 180 space degrees from the corresponding grating of the other pair of pick-off means as related to the position of said workpiece rulings; said first and second support means further maintaining said pick-off gratings in close proximity to and in a plane parallel to said rulings of said workpiece, means fixed with respect to said first and second support means for producing additional light-transmitting rulings on said workpiece, means for moving said device relative to said workpiece and means connected to receive the outputs of said pick-off means to indicate their relative outputs, whereby when the outputs of each pair of pick-off means are substantially equivalent and the magnitudes of the outputs of a preselected pair of pick-off means is greater than the magnitudes of the outputs of the other pair of pick-off means, said workpiece and said device are in said predetermined space relationship.

2. In a position indicating and marking device for a workpiece having parallel, alternate equiwidth light transmitting and equiwidth light absorbing sections, the distance between corresponding points on said alternate sections being equivalent to 360 space degrees, a first and second pair of pickoff heads, each head having alternate light transmitting and light absorbing sections congruous to said workpiece sections, support means for positioning said pickoff heads on one side of said workpiece with said light absorbing and light transmitting head sections parallel with and adjacent to said workpiece sections, the sections of each of said heads having a space phase relative to the sections of said workpiece, said space phase of the sections of one head of said first pair differing by 90° from said space phase of the sections of the other head of said first pair, said space phase of the sections of one head of said second pair differing by 90° from said space phase of the sections of the other head of said second pair and differing by 180° from said space phase of the sections of one head of said first pair, said space phase of the sections of the other head of said second pair differing by 180° from said space phase of the sections of the other head of said first pair, a source of collimated light positioned proximate to said workpiece sections adjacent said pickoff head sections and on the side of said workpiece opposite said pickoff heads, light detecting and comparing means for determining and comparing the magnitude of light entering each of said pick-off heads, means fixed relative to said pick-off heads for making similar additional parallel alternate light-transmitting and light-absorbing sections, congruous to said sections, on said workpiece, and means for moving said workpiece relative to said pickoff heads in the direction to be positionally indicated.

3. In a workpiece positioning and marking device, said workpiece having a grating of uniformly spaced, parallel, light-transmitting and light-absorbing sections, a light source, a first pick-off having a grating congruent to a portion of said workpiece grating, said workpiece grating being positioned between said light source and said first pickoff grating, said first pick-off having an output proportional to the light transmitted through said gratings, a second pick-off substantially identical to said first pick-off, said second pick-off being positioned similarly relative to said workpiece grating and said light source and on the same side of said workpiece as said first pick-off, support means maintaining a fixed spacing between the corresponding gratings of said pick-offs, means fixed relative to said pick-offs for marking on said workpiece additional light-transmitting and light-absorbing sections similar to said first mentioned sections, and means for comparing the outputs of said pick-offs whereby the correct position for marking additional sections on said workpiece is a preselected position corresponding to predetermined pick-off outputs.

4. A device for positioning a workpiece having substantially uniform rulings of light-transmitting and light-absorbing sections and for producing similar uniform rulings thereon, comprising four pick-offs spaced an effective 90 space degrees apart relative to successive rulings on said workpiece, the distance between corresponding portions of said rulings successive to each other being equivalent to 360 space degrees, each of said pick-offs having a grating with light-transmitting and light-absorbing sections substantially congruent to the rulings on said workpiece, said pick-off gratings being positioned in close proximity to and parallel to said workpiece rulings, each of said pick-offs having an output proportional to the light transmitted respectively through its gratings and through said workpiece rulings, means fixed relative to said pick-offs for making additional similar uniform rulings on said workpiece, and means for moving said device relative to said workpiece whereby when the magnitude of the outputs of preselected pick-off pairs are substantially equal and when one preselected pick-off pair has outputs which are greater than those of the other pair, the means for making additional rulings and the workpiece are in a predetermined space relationship.

5. A device for accurately positioning and marking a gauge, said gauge having a plurality of alternately transparent and opaque parallel sections, the distance between corresponding points on said alternate sections being equivalent to 360 space degrees, comprising first and second gratings having a plurality of transparent and opaque sections congruent to said sections on said gauge, means for supporting said first and second gratings with the sections of said gratings in close proximity and substantially parallel to said gauge sections and further for maintaining a 90 space degree phase difference between said gratings as related to said gauge sections, a photosentive device having a signal output which is a predetermined function of the magnitude of its light input, a source of light positioned to direct rays of light onto said gauge sections and said sections of said gratings in a direction normal to said sections and the direction of positioning, means for alternately directing the light rays transmitted from said source through said gauge and grating sections onto said photosensitive device, means fixed relative to said gauge gratings for marking additional similar grating sections on said gauge, signal sensitive means connected to indicate the relative magnitude of successive output signals from said photosensitive device, and means for moving said gratings relative to said gauge in the predetermined positioning direction, whereby the position for marking additional grating sections on said gauge is a preselected position in which said successive output signals from said photosensitive device are equal.

6. A device for positioning and marking a gauge, said gauge having parallel alternate light-transmitting and light-absorbing sections, comprising three pick-off means, each having a grating of parallel light-transmitting and light-absorbing sections substantially congruent to the sections of said gauge, said pick-offs having outputs proportional to the light transmitted through their respective gratings, support means maintaining the sections of said gratings of said pick-off means in close proximity to and parallel to said sections of said gauge and further maintaining the spacings between the gratings of said pick-off means preselected numbers of space degrees apart as related to the position of said gauge sections, 360 space degrees being equivalent to the distance between corresponding points on said alternate sections of said gauge, means subjecting the parallel sections of said gratings and adjacent sections of said gauge to substantially parallel rays of light, means fixed relative to said pick-offs for marking similar additional light-absorbing and light-transmitting sections on said gauge, and means for comparing the outputs of said pick-offs whereby the correct position for marking additional sections on said gauge is the position of parity of output of two predetermined pick-offs and of predetermined magnitude of output of the third pick-off relative to that of said predetermined pick-offs.

7. The device as recited in claim 6 and further comprising means for moving said gauge and said marking means relative to said pick-off gratings.

References Cited in the file of this patent

UNITED STATES PATENTS

| | | |
|---|---|---|
| 2,122,818 | Ladrach | July 5, 1938 |
| 2,406,299 | Koulicovitch | Aug. 20, 1946 |
| 2,416,968 | Turrettini | Mar. 4, 1947 |

FOREIGN PATENTS

| | | |
|---|---|---|
| 476,720 | Canada | Sept. 4, 1951 |